(12) United States Patent
Kajio et al.

(10) Patent No.: US 8,146,208 B2
(45) Date of Patent: Apr. 3, 2012

(54) ASSIST GRIP

(75) Inventors: Hideki Kajio, Toyota (JP); Shouji Kawakami, Toyota (JP); Kazuhiro Kawamura, Anjo (JP)

(73) Assignee: Howa Plastics Co., Ltd., Toyota-shi, Aichi (JP)

( * ) Notice: Subject to any disclaimer, the term of this patent is extended or adjusted under 35 U.S.C. 154(b) by 191 days.

(21) Appl. No.: 12/733,835

(22) PCT Filed: Dec. 24, 2009

(86) PCT No.: PCT/JP2009/071414
§ 371 (c)(1),
(2), (4) Date: Mar. 23, 2010

(87) PCT Pub. No.: WO2011/048712
PCT Pub. Date: Apr. 28, 2011

(65) Prior Publication Data
US 2011/0214255 A1    Sep. 8, 2011

(30) Foreign Application Priority Data
Oct. 19, 2009    (JP) ................................ 2009-240892

(51) Int. Cl.
*A45C 13/26* (2006.01)
(52) U.S. Cl. .................................... 16/444; 296/1.02
(58) Field of Classification Search .............. 16/444, 16/445, 418, 412, 438, DIG. 40, DIG. 41; 296/39.1, 214, 210, 1.08, 1.02; 24/293–295, 24/338, 457–458, 467, 479, 482, 489, 490; 74/551.9, 551.8, 557; 411/45, 57.1, 58, 59, 411/78
See application file for complete search history.

(56) References Cited

U.S. PATENT DOCUMENTS

| | | | | |
|---|---|---|---|---|
| 3,282,657 A | * | 11/1966 | Bright | 428/575 |
| 3,389,438 A | * | 6/1968 | Haynes | 24/561 |
| 4,404,709 A | * | 9/1983 | Janz et al. | 16/444 |
| 4,715,197 A | * | 12/1987 | Wattley | 62/515 |
| 6,049,963 A | * | 4/2000 | Boe | 29/525.01 |
| 6,141,837 A | * | 11/2000 | Wisniewski | 24/295 |
| 6,241,294 B1 | * | 6/2001 | Young et al. | 292/336.3 |

(Continued)

FOREIGN PATENT DOCUMENTS

JP    A-2009-63148    3/2009

(Continued)

OTHER PUBLICATIONS

International Search Report of the International Searching Authority mailed on Apr. 6, 2010 for the corresponding international patent application No. PCT/JP2009/071414.

*Primary Examiner* — Chuck Y. Mah
(74) *Attorney, Agent, or Firm* — Ingrassia Fisher & Lorenz, PC

(57) ABSTRACT

An assist grip includes a mounting clip formed of metal having spring resiliency and bent into a generally U shape. The mounting clip includes a pair of resilient legs. Each of the resilient legs includes a bulging portion that bulges outwardly and is provided with a retention portion to be retained by a mounting location of a vehicle body structure. Each of the resilient legs further includes at the leading end a stepped region for engagement against an inner peripheral region of a rectangular opening of a hinge body. The stepped region includes an extended region and a retaining pawl that extends outwardly relative to the extended region.

3 Claims, 15 Drawing Sheets

U.S. PATENT DOCUMENTS

| | | | |
|---|---|---|---|
| 2002/0020250 A1* | 2/2002 | Sakuma et al. | 74/551.9 |
| 2002/0047293 A1* | 4/2002 | Noda | 296/214 |
| 2003/0200634 A1* | 10/2003 | Hansen | 24/297 |
| 2003/0234549 A1* | 12/2003 | Totani et al. | 296/1.02 |
| 2005/0116485 A1* | 6/2005 | Kuroda | 296/1.08 |
| 2005/0248167 A1* | 11/2005 | Totani et al. | 296/1.02 |
| 2007/0102944 A1 | 5/2007 | Kato et al. | |
| 2008/0018128 A1* | 1/2008 | Yamagiwa et al. | 296/1.02 |
| 2008/0098563 A1* | 5/2008 | Lee et al. | 16/110.1 |

FOREIGN PATENT DOCUMENTS

| | | |
|---|---|---|
| JP | A-2009-121633 | 6/2009 |
| WO | WO 2004/108473 A1 | 12/2004 |
| WO | WO 2008/055838 A1 | 5/2008 |

* cited by examiner

ASSIST GRIP

CROSS REFERENCE TO RELATED APPLICATION

This application is a U.S. national stage of PCT/JP2009/071414 filed on Dec. 24, 2009, and is based on Japanese Patent Application No. 2009-240892 filed on Oct. 19, 2009, the disclosures of which are incorporated herein by reference in their entirety.

TECHNICAL FIELD

The present invention relates to an assist grip mountable on a ceiling or the like inside a vehicle compartment, and more particularly, the invention relates to an assist grip that is secured to a mounting location of the vehicle in a rotatable fashion through the use of a hinge assembly.

BACKGROUND ART

Assist grips or handles are installed on a ceiling of a vehicle compartment to provide a support for vehicle occupants. In a known design of this kind of assist grips, the grip includes a grip body, cavities located at opposite sides of the grip body and hinge assemblies installed in the cavities in a rotatable fashion, such that the grip body is rotatably mounted on a vehicle by the hinge assemblies provided at opposite sides.

As disclosed in Patent Literature 1 shown below, this assist grip includes on the hinge assemblies at opposite sides thereof mounting clips made of metal that are used to secure the grip to the body panel of a vehicle body. This mounting clip is formed into a generally "U" shape with metal having spring resiliency, and so fitted to a body of the hinge assembly as to cover a center support plate of the hinge body. Upon installation to the vehicle body structure, the mounting clips are inserted into rectangular holes formed on the body panel of the vehicle body such that engaging portions of bulging regions of each of the mounting clips engage with the periphery of the rectangular hole of the body panel, thus the assist grip is secured to the vehicle body structure.

PRIOR ART DOCUMENTS

Patent Literature 1: JP2009-121633

SUMMARY OF THE INVENTION

Problems to be Solved by the Invention

Referring to FIG. 15, in a conventional assist grip disclosed in the above literature, when a mounting clip 60 is assembled with a hinge body 65, the mounting clip 60 is firstly placed over the back side of a center support plate 66 of the hinge body 65. In that state, resilient legs 68 located on opposite sides of the mounting clip 60 are pressed inwardly against spring resiliency so that a space between the legs 68 is reduced, and passed, from the leading ends, through an opening 67 of the hinge body 65 which is narrower than the width of the free end of the mounting clip 60. Then stepped regions 64 formed at the leading ends of the resilient legs 68 engage with the inner periphery of the opening 67 of the hinge body 65, thus the mounting clip 60 is assembled with the hinge body 65.

This assembling work required an assembly worker to press the resilient legs 68 of the mounting clip 60 inwardly forcefully against spring resiliency by fingers or the like, which was hard and sometimes even caused an injury. Pressing the resilient legs 68 of the mounting clip 60 forcefully inwardly against spring resiliency could also deteriorate the resiliency of the resilient legs 68 or break the resilient legs 68.

Furthermore, as shown in FIG. 15, the hinge body 65 of the above literature requires the center support plate 66 on the back side thereof to keep the mounting clip 60 engaged. This configuration complicates the structure of the hinge body 65 and the structure of the mold, and the complexity has increased the cost for manufacturing an assist grip handle.

The present invention contemplates to solve the problems described above, and has an object to provide an assist grip that provides easy assembling of a mounting clip to a hinge body and has a simple structure of the hinge body.

Means for Solving the Problems

The assist grip of the invention includes:
- a grip body for hand-holding, the grip body including first and second bases at opposite ends thereof and first and second cavities respectively formed on the back of the bases;
- first and second hinge assemblies pivotally connected to the cavities via pivot shafts and respectively including first and second hinge bodies, each of the hinge bodies including generally a rectangular opening at the center; and
- first and second mounting clips formed of metal having spring resiliency and bent into a generally U shape and respectively inserted into the rectangular openings.

Each of the mounting clips includes a pair of resilient legs. Each of the resilient legs includes a bulging portion that bulges outwardly and is provided with a retention portion to be retained by a mounting location of a vehicle body structure. Each of the resilient legs further includes at a leading end a stepped region engaged against an inner peripheral region of the rectangular opening of one of the hinge bodies.

Each of the stepped regions of each of the mounting clips includes an extended region that extends in parallel to a direction of insertion of the mounting clip into the rectangular opening and a retaining pawl that extends outwardly relative to the extended region. Each of the hinge bodies includes a pair of holding portions that hold the retaining pawls of the mounting clip when the mounting clips are inserted into the rectangular openings of the hinge bodies from the front side of the hinge bodies.

According to the invention, when assembling the mounting clips with the hinge bodies, the mounting clips are easily assembled therewith by being inserted into the rectangular openings from the front side of the hinge bodies. In the assembled state, the retention of the retaining pawls of the mounting clips by the holding portions of the hinge bodies as well as the retention of the stepped regions of the resilient legs by the inner peripheral regions of the rectangular openings fasten the mounting clips to the hinge bodies in a stable manner, even without a center support plate formed in the rectangular opening to support the clips in prior designs of the hinge assembly.

Accordingly, an assembly worker no longer has to press resilient legs forcefully against spring resiliency to assemble the mounting clips with the hinge bodies, but can easily assemble the mounting clips with the hinge bodies from the front side of the hinge assemblies. Not having to press the resilient legs forcefully against spring resiliency also gets rid of a fear of deterioration of resiliency of the resilient legs and breakage of the resilient legs. Moreover, since the rectangular openings of the hinge bodies are wholly open without a center support plate which was required in the prior designs, the structures of the molds for the hinge bodies will be simplified and thus reducing the cost for manufacturing a hinge body.

Each of the retaining pawls of the above assist grip may be comprised of a central part of the extended region so parted from remainder of the extended region as to project obliquely forward and outwardly relative to the extended region.

This configuration will enable the retaining pawls to be engaged against the hinge body in a further stable manner.

The holding portions may be comprised of peripheries of a pair of holes provided on opposite side walls of the rectangular opening of the hinge body.

This configuration will secure the engagement of the retaining pawls with the holding portions in a simple fashion.

Advantageous Effect of the Invention

The assist grip of the invention provides easy and secure assembly of the mounting clips with the hinge bodies and simplifies the structure of the hinge bodies.

MODE FOR CARRYING OUT THE INVENTION

Figure 1:
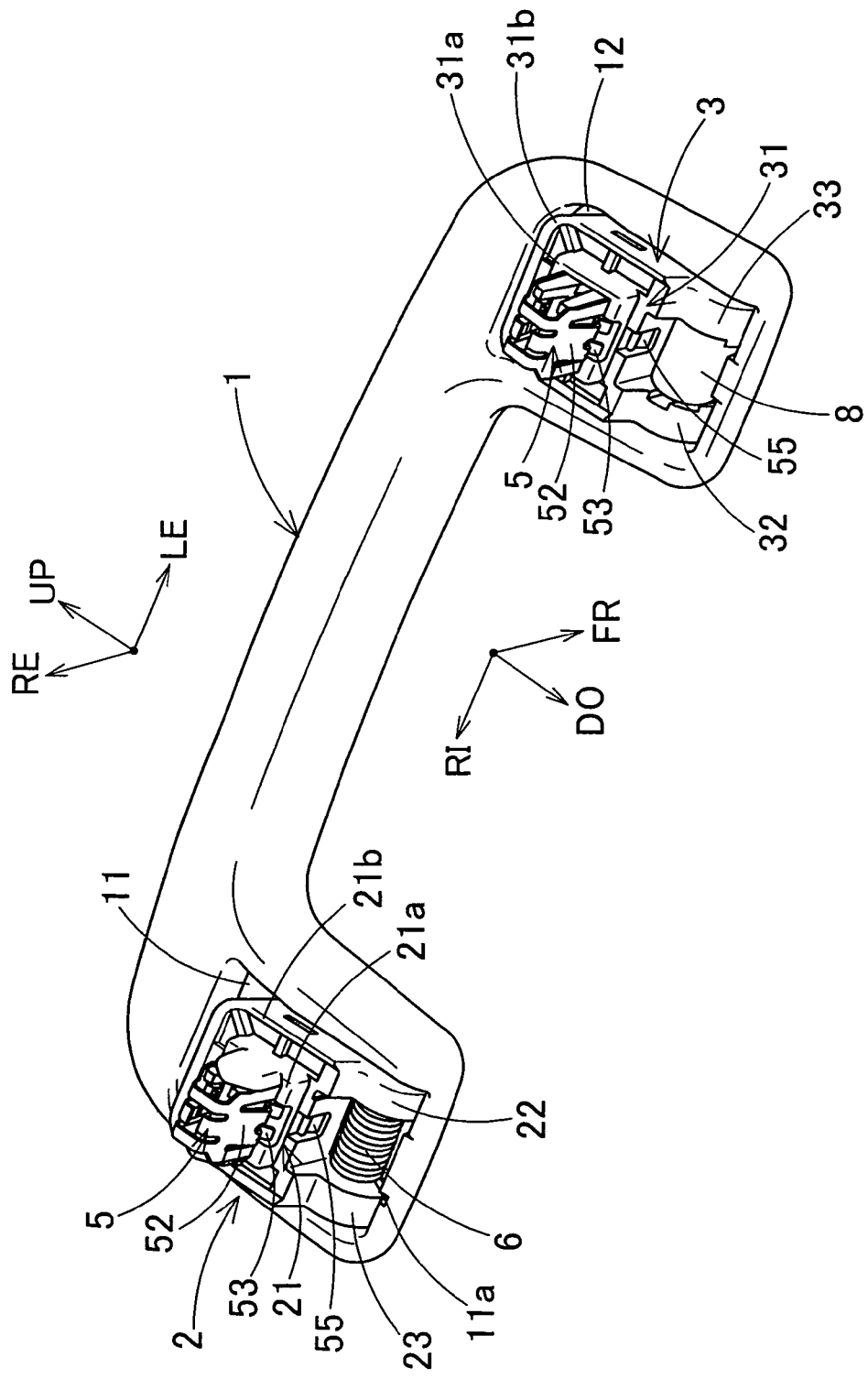
FIG. 1 is a rear perspective view of an assist grip embodying the invention.
Figure 2:
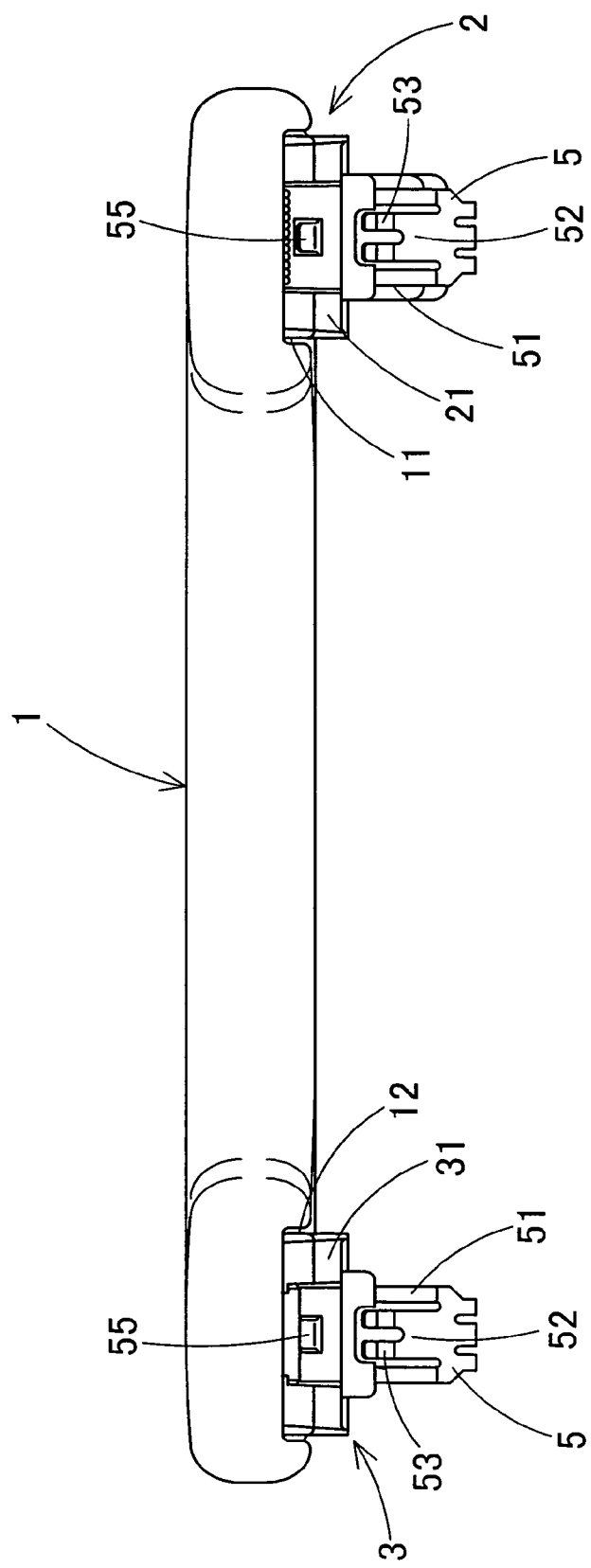
FIG. 2 is a bottom view of the assist grip.
Figure 3:
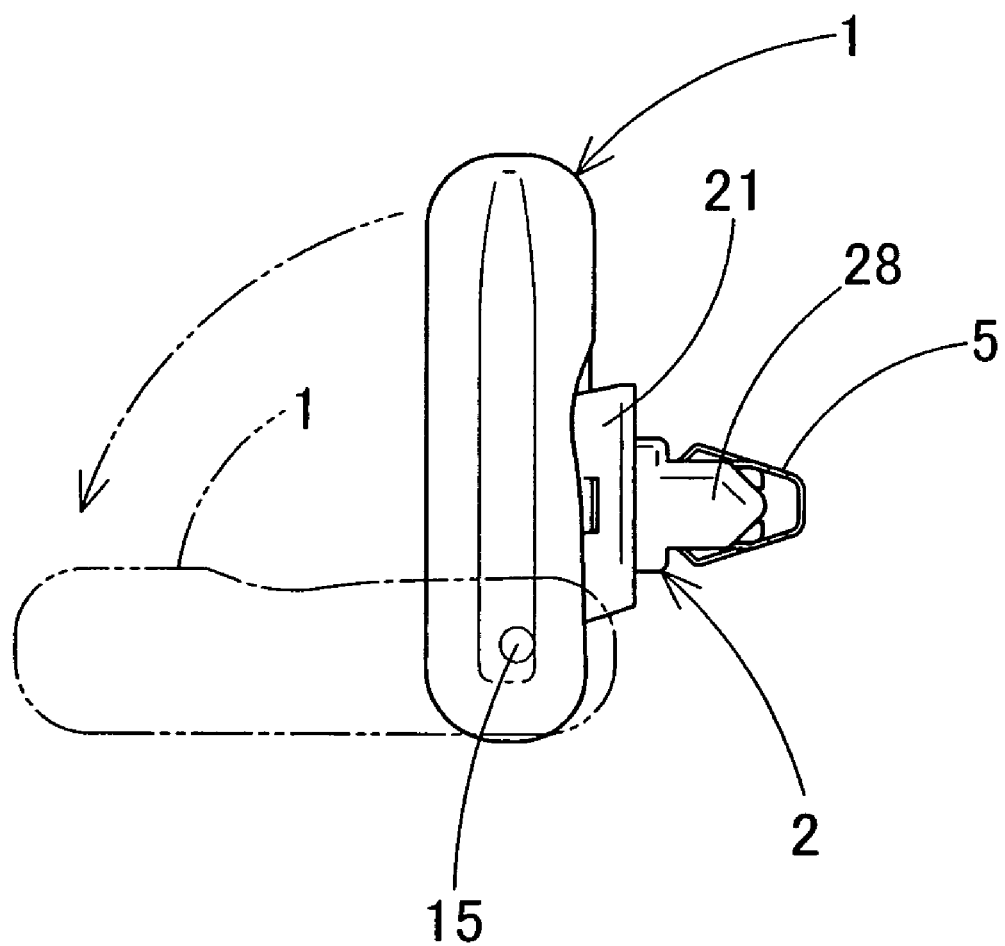
FIG. 3 is a right side view of the assist grip.
Figure 4:
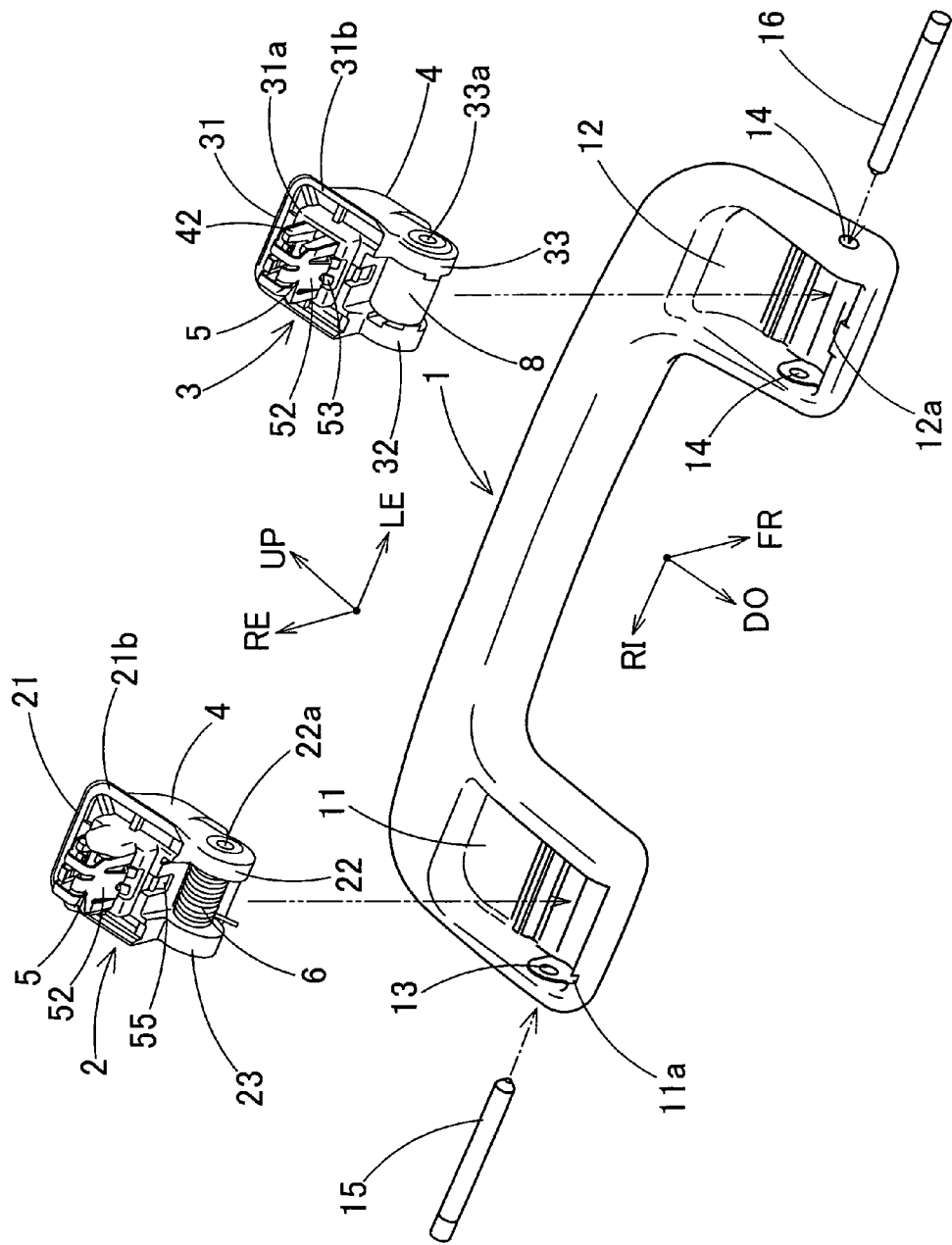
FIG. 4 is an exploded perspective view of the assist grip as viewed from the rear.

An embodiment of the present invention is described below with reference to the accompanying drawings. FIG. 1 is a rear perspective view, FIG. 2 is a bottom view, FIG. 3 is a right side view, and FIG. 4 is an exploded perspective view, of an assist grip according to the present invention. Left, right, up and down referred to in the following description are intended to refer to left, right, up and down of the assist grip as mounted on a vehicle. "FR", "LE", "RI", "UP", "RE" and "DO" used in the drawings refer to front, left, right, up, rear and down, respectively.

In FIGS. 1 to 4, the reference numeral 1 indicates a grip body of the assist grip integrally molded of synthetic resin. The grip body 1 includes on the back of bases located at left and right ends thereof generally rectangular cavities 11 and 12, respectively. On opposed left and right side walls inside each of the cavities 11 and 12 are shaft holes 13 and 14, respectively, and the pivot shafts 15 and 16 are respectively inserted through the shaft holes 22a, 23a, 32a and 33a formed on inner supports 22, 32 and outer supports 23, 33 of later-described hinge assemblies 2 and 3 and through the shaft holes 13 and 14 of the side walls, thus the hinge assemblies 2 and 3 are pivotally supported relative to the grip body 1. When a pair of the hinge assemblies 2 and 3 are secured to a body structure of a vehicle, the grip body 1 is rotatable between the non-use and in-use conditions, relative to the hinge assemblies 2 and 3.

Figure 5:
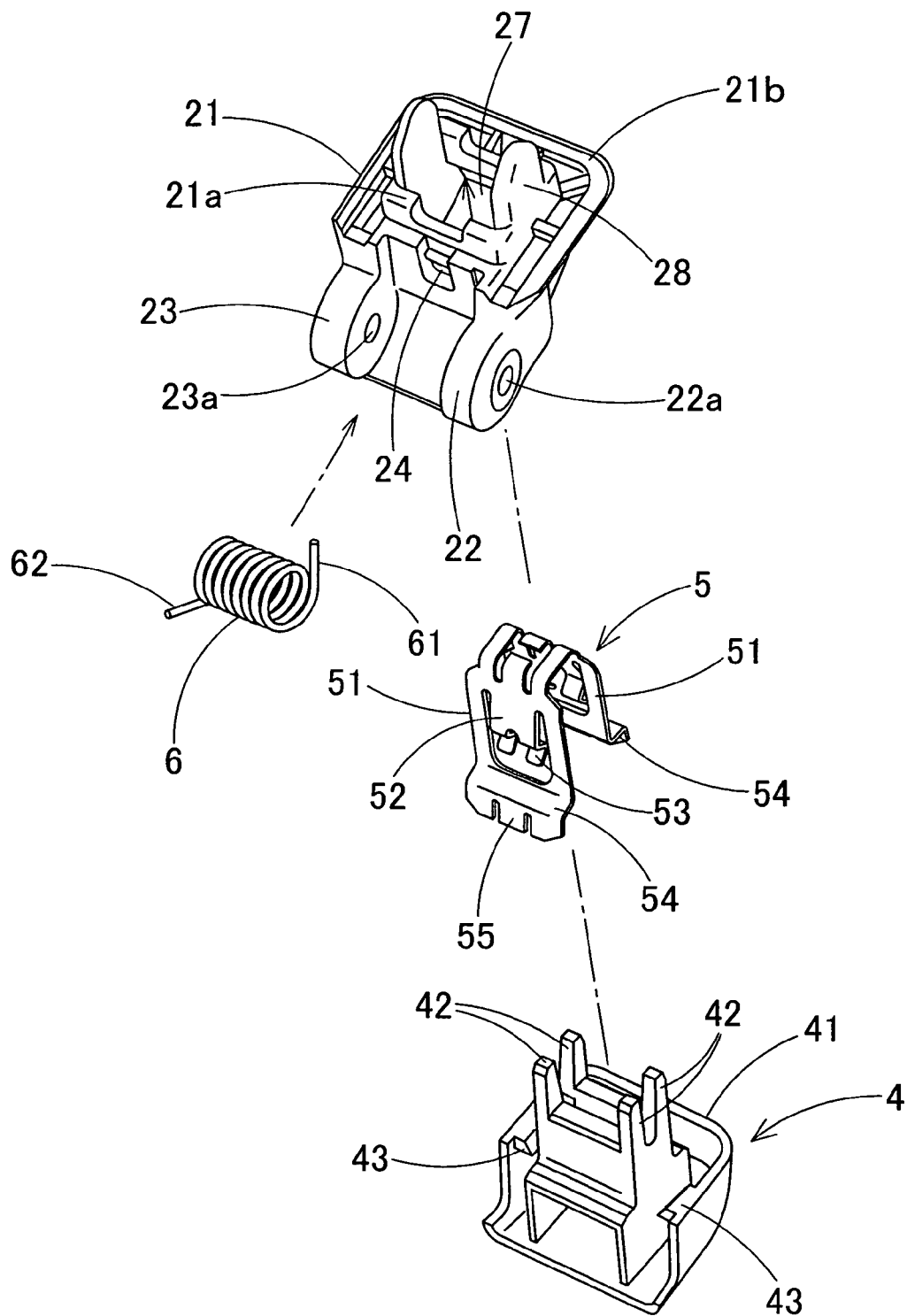
FIG. 5 is an exploded perspective view of a right hinge assembly 2 as viewed from the rear.
Figure 6:
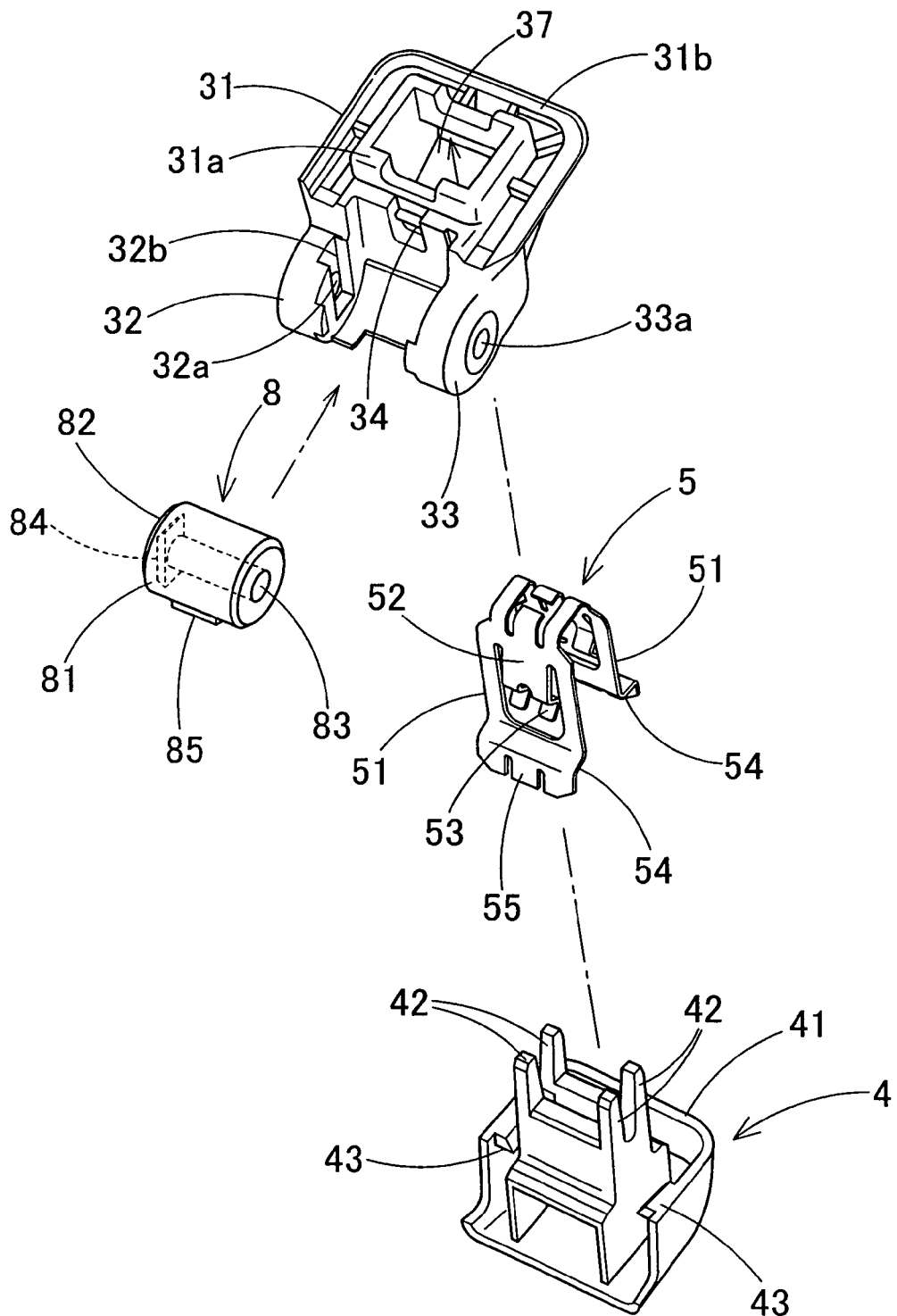
FIG. 6 is an exploded perspective view of a left hinge assembly 3 as viewed from the rear.

Referring to FIGS. 4, 5 and 6, the hinge assembly 2 located on the right side of the grip body 1 includes a hinge body 21, a mounting clip 5 that is set in the hinge body 21 from the front side for insertion into and engagement with a rectangular hole (not shown) formed on a body panel of a vehicle body, a cover 4 that is so fitted to the hinge body 21 as to cover the front side of the hinge body 21 and supports the mounting clip 5 from inside by insertion of a clip support portion 42 thereof into a later-described rectangular opening 27 of the hinge body 21, and a torsion coil spring 6 that is installed between the inner support 22 and outer support 23 formed at the lower side of the hinge body 21.

In a similar manner, the hinge assembly 3 on the left side includes a hinge body 31, a mounting clip 5 that is set in the hinge body 31 from the front side for insertion into and engagement with a rectangular hole (not shown) formed on a body panel of the vehicle body, a cover 4 that is so fitted to the hinge body 31 as to cover the front side of the hinge body 31 and supports the mounting clip 5 from inside by insertion of the clip support portion 42 into a rectangular opening 37 of the hinge body 31, and an oil damper 8 that is interposed between the inner support 32 and outer support 33 formed at the lower side of the hinge body 31 to load against rotation of the grip body 1.

As shown in FIGS. 5, 7(a) to (c), 8(a) and 8(b), the hinge body 21 of the right hinge assembly 2 is formed into a cube which is generally quadrate in front view. The hinge body 21 is integrally molded of synthetic resin together with an inner support 22 and an outer support 23, which are located at the lower region of the hinge body 21. The hinge body 21 includes between the inner support 22 and outer support 23 a space for receiving the torsion coil spring 6, and a rectangular opening 27 is formed generally at the center of the hinge body 21. The hinge body 21 further includes on the back side of the rectangular opening 27 a rectangular frame 21a formed in a projecting manner. A seat portion 21b is formed around and one step lower than the rectangular frame 21a for abutment against the surface of the body panel of the vehicle as the hinge body 21 is inserted into the rectangular hole of the body panel by fitting of the rectangular frame 21a therein.

The inner support 22 and outer support 23 formed at the lower region of the hinge body 21 respectively include shaft holes 22a and 23a running through the supports 22 and 23. As shown in FIG. 4, a pivot shaft 15 is inserted through the shaft holes 22a and 23a to support the hinge body 21 inside the cavity 11 of the grip body 1 in a roratable manner. As shown in FIGS. 7(a) to (c), 8(a) and 8(b), the hinge body 21 is provided on both sides with cover engaging portions 29 for engagement with engaging pawls 43 formed at the inner side of the cover 4 when the cover 4 is fitted to the front side of the hinge body 21 as described below. As shown in FIG. 5, the rectangular opening 27 formed generally at the center of the hinge body 21 is formed into such a shape as to receive the later-described mounting clip 5 from the rear and so configured as to receive later-described clip support portions 42 projecting from the back side of the cover 4 when the cover 4 is fitted.

Figure 7A:
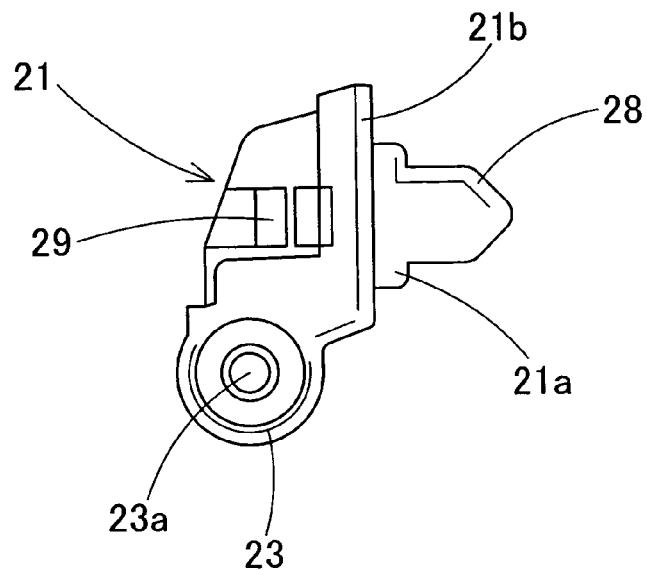
FIG. 7(a) is a right side view of a hinge body 21 of the hinge assembly 2.
Figure 7B:
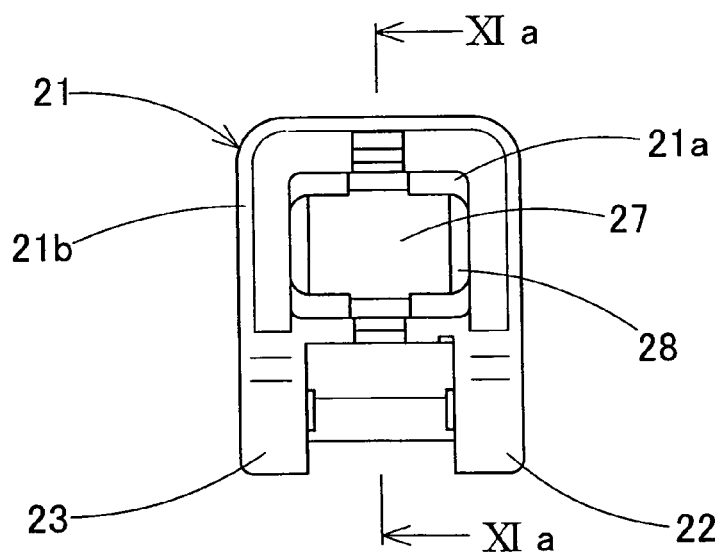
FIG. 7(b) is a rear view of the hinge body 21.
Figure 7C:
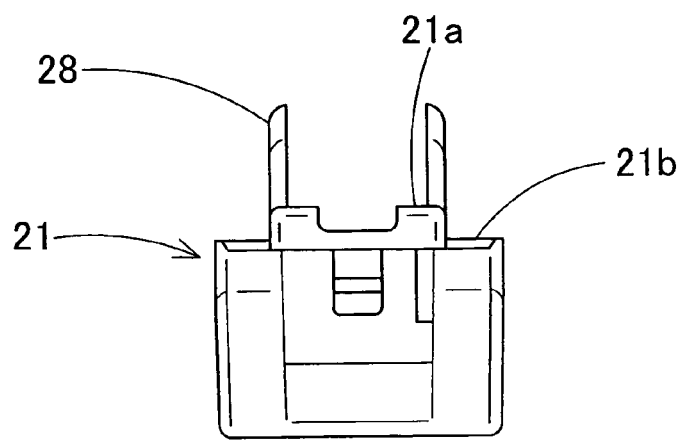
FIG. 7(c) is a plan view of the hinge body 21.
Figure 8A:
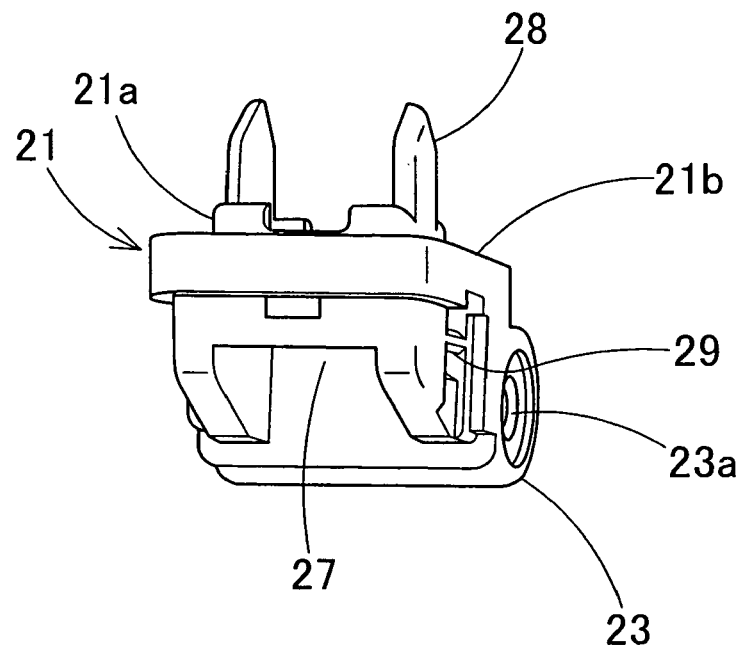
FIG. 8(a) is a perspective view of the hinge body 21 as viewed from upper front.
Figure 8B:
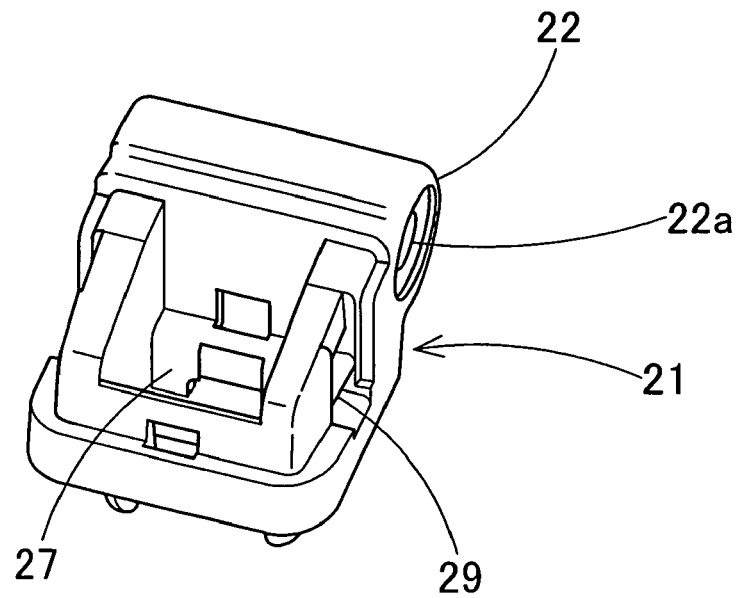
FIG. 8(b) is a perspective view of the hinge body 21 as viewed from a different angle.
Figure 9A:
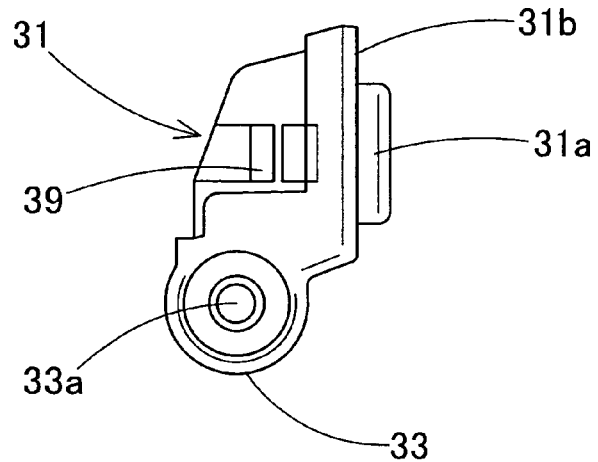
FIG. 9(a) is a right side view of a hinge body 31 of the hinge assembly 3.
Figure 9B:
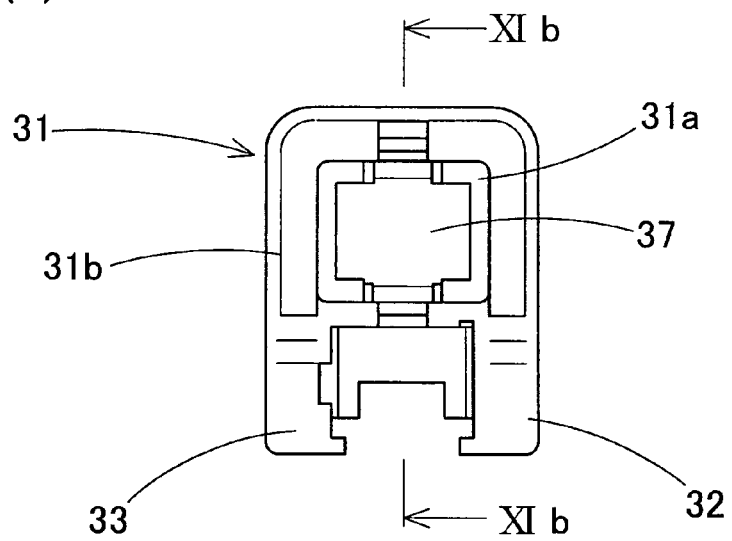
FIG. 9(b) is a rear view of the hinge body 31.
Figure 9C:
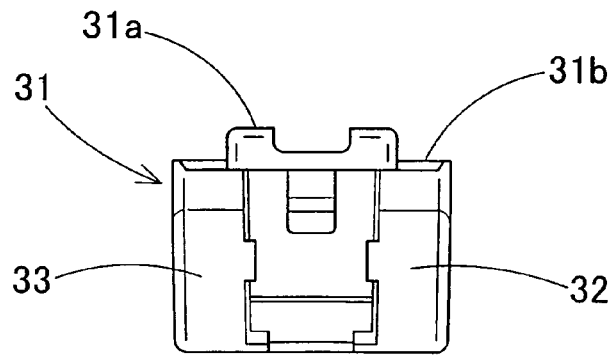
FIG. 9(c) is a plan view of the hinge body 31.
Figure 10A:
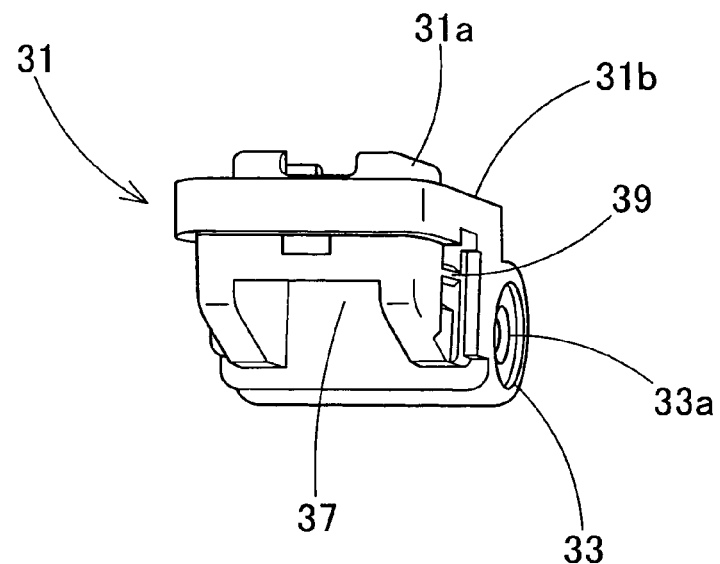
FIG. 10(a) is a perspective view of the hinge body 31 as viewed from upper front.
Figure 10B:
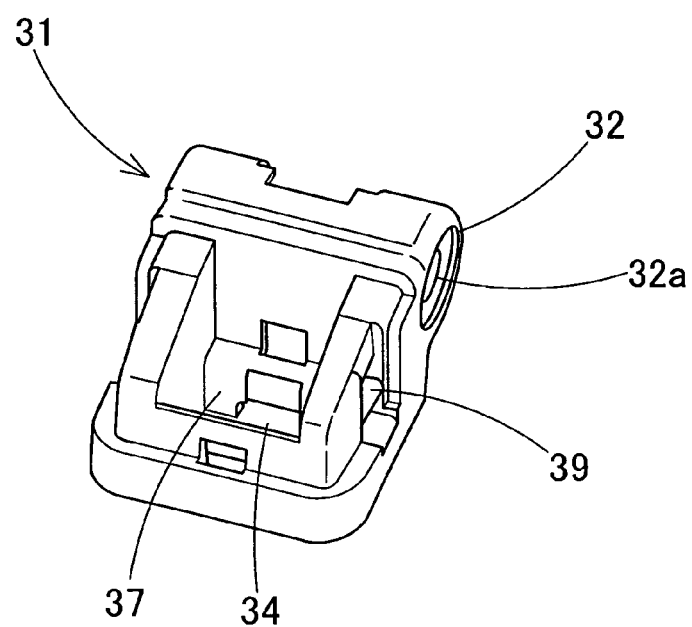
FIG. 10(b) is a perspective view of the hinge body 31 as viewed from a different angle.
Figure 11A:
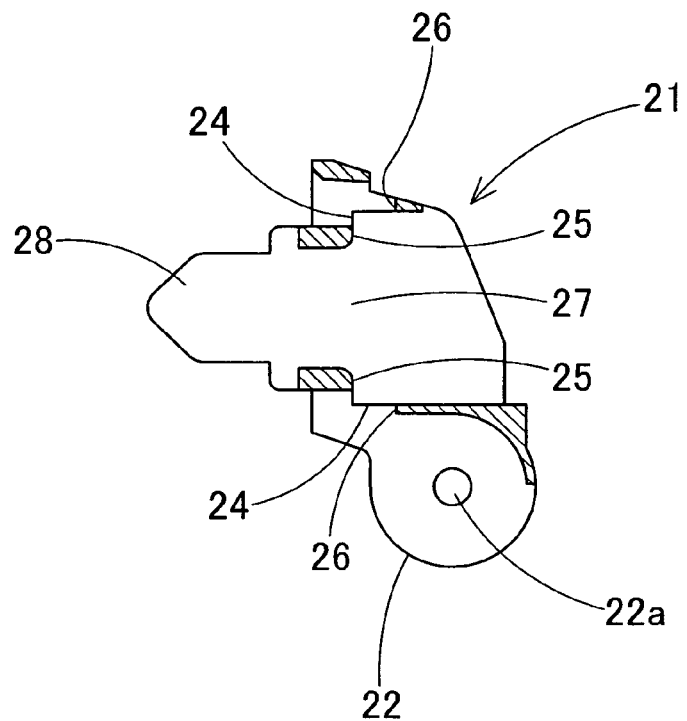
FIG. 11(a) is a sectional view taken along line XIa-XIa of FIG. 7(b)

As shown in FIG. 11(a), the hinge body 21 is provided on both inner sides of the rectangular opening 27 with a pair of inner peripheral regions 25 projecting inwardly to retain later-described stepped regions 54 of the mounting clip 5. In front of the inner peripheral regions 25 are a pair of holes 24, and in front of the holes 24 and on both inner sides of the rectangular opening 27 are a pair of holding regions 26 for holding retaining pawls 55 of the mounting clip 5. As best shown in FIG. 7(a), the hinge body 21 includes on opposite sides of the rectangular openings 27 a pair of projections 28 that project rearward. When the hinge body 21 is fitted into the rectangular hole of the vehicle body panel upon assembling, the projections 28 contact with left and right edges of the rectangular hole by the outer surfaces and prevent the hinge body 21 and grip body 1 from jolting in a left and right direction.

Generally similarly to the right hinge body 21, the hinge body 31 of the left hinge assembly 3 is formed into a cube which is generally quadrate in front view and is integrally molded of synthetic resin together with the inner support 32 and outer support 33 as shown in FIGS. 4, 6 and 9(a) to 9(c). The hinge body 31 includes between the inner support 32 and outer support 33 a space for receiving the oil damper 8, and a rectangular opening 37 is formed generally at the center of the hinge body 31. The hinge body 31 further includes on the back side of the rectangular opening 37 a rectangular frame 31a formed in a projecting manner. A seat portion 31b is formed around and one step lower than the rectangular frame 31a, which seat portion 31b abuts against the surface of the body panel of the vehicle as the hinge body 31 is inserted into the rectangular hole of the body panel by fitting the rectangular frame 31a therein.

As shown in FIGS. 4, 6 and 9(a) to 9(c), the inner support 32 and outer support 33 formed at the lower region of the hinge body 31 respectively include a shaft hole 32a and 33a running through the supports 32 and 33. A pivot shaft 16 is inserted through the shaft holes 32a and 33a to support the hinge body 31 inside the cavity 12 of the grip body 1 in a roratable manner. As shown in FIGS. 9A to 9C, 10A and 10B, the hinge body 31 is provided on both sides with cover engaging portions 39 for engagement with the engaging pawls 43 of the cover 4 when the cover 4 is fitted to the front side of the hinge body 31. As shown in FIG. 6, the rectangular opening 37 formed generally at the center of the hinge body 31 is formed into such a shape as to receive the mounting clip 5 from the rear and so configured as to receive the clip support portions 42 projecting from the back side of the cover 4 when the cover 4 is fitted.

Figure 11B:
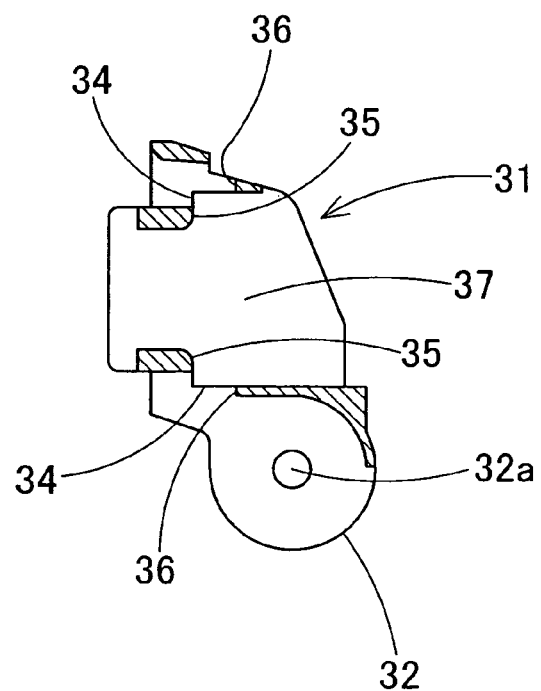
FIG. 11(b) is a sectional view taken along line XIb-XIb of FIG. 9(b)

As shown in FIG. 11(b), the hinge body 31 is provided on both inner sides of the rectangular opening 37 with a pair of inner peripheral regions 35 projecting inwardly for retaining the stepped regions 54 of the mounting clip 5. In front of the inner peripheral regions 35 are a pair of holes 34, and in front of the holes 34 and on both inner sides of the rectangular opening 37 are a pair of holding regions 36 for holding the retaining pawls 55 of the mounting clip 5.

As are shown in FIGS. 7(a) to 7(c), 8(a), 8(b), 9(a) to 9(c), 10(a) and 10(b), differently from the prior designs, each of the hinge bodies 21 and 31 does not have a center support plate on the rectangular opening 27/37, but has the whole opening 27/37 open. This configuration will help simplify the structure of the mold for the hinge bodies 21/31, and thus reducing the cost for manufacturing the hinge bodies.

Figure 12A:
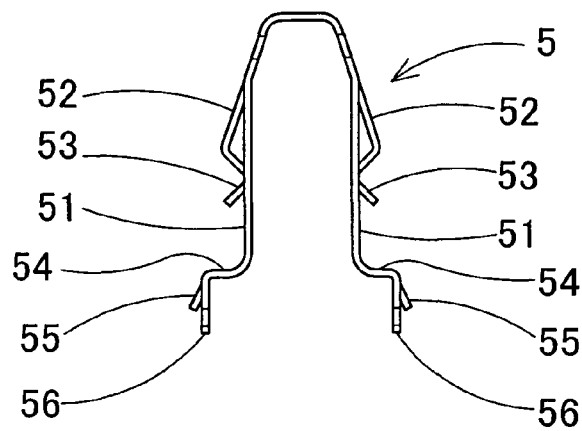
FIG. 12(a) is a side view of a mounting clip.
Figure 12B:
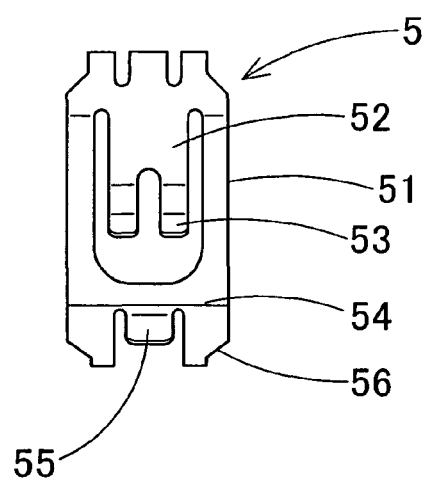
FIG. 12(b) is a plan view of the mounting clip.
Figure 12C:
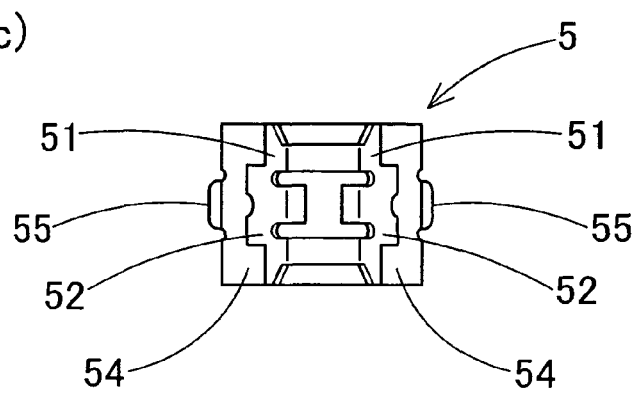
FIG. 12(c) is a rear view of the mounting clip.

As has been described, the mounting clips 5 are inserted and fitted into the rectangular openings 27 and 37 of the hinge bodies 21 and 31. As shown in FIGS. 12(a) to 12(c), each of the mounting clips 5 is formed of metal having spring resiliency and bent into a generally U shape, and thus includes a pair of resilient legs 51 having spring resiliency. Each of the resilient legs 51 includes a bulging portion 52 that is formed by cutting and raising part of the inner region of the leg 51 outwardly. Each of the bulging portions 52 projects outwardly relative to the resilient leg 51 in a elastically deformable manner, and is provided at the leading end with a retention portion 53 which is bent in shape. The retention portions 53 are to be retained by peripheries of the rectangular hole, i.e. the mounting location, of the body panel of the vehicle body, when the mounting clip 5 is set in the hole.

Figure 13:
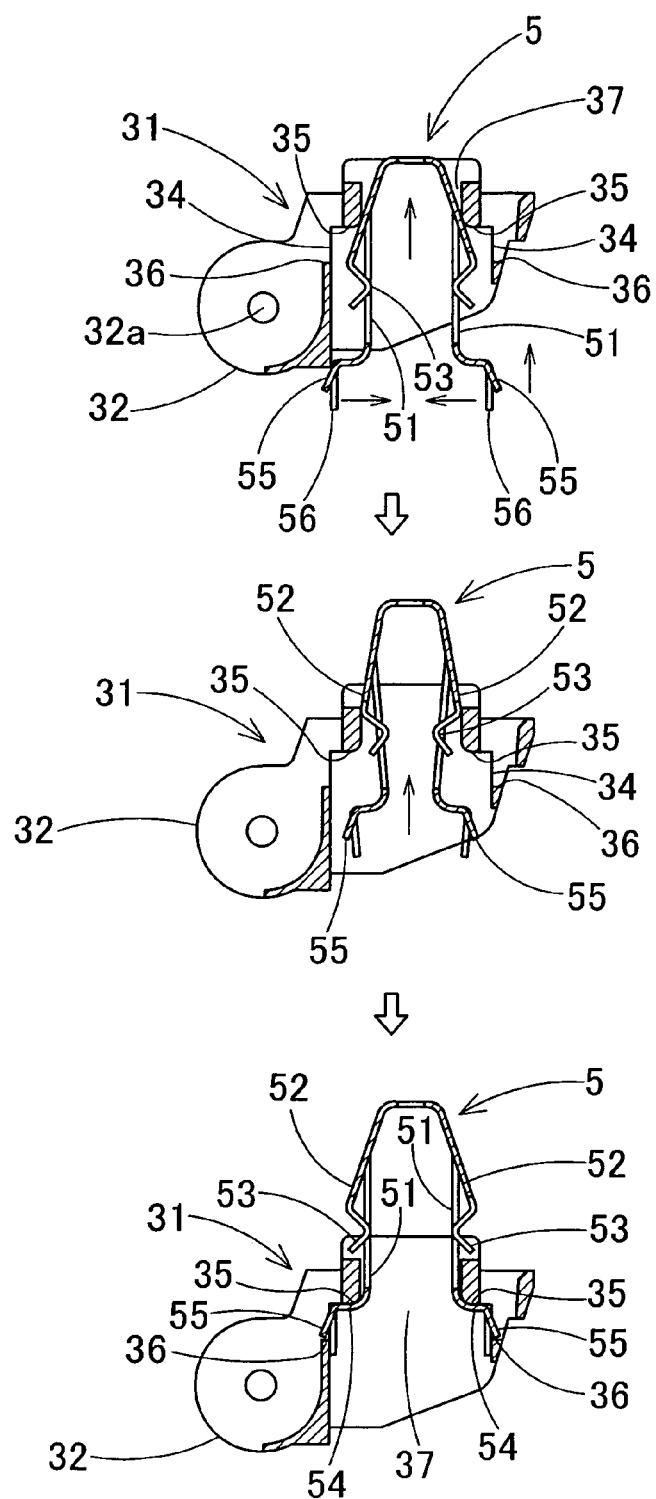
FIG. 13 is a diagram illustrating the insertion of the mounting clip into the hinge body 21 by sectional views.

As best shown in FIG. 12(a), each of the resilient legs 51 further includes a stepped region 54 in the vicinity of the leading end. The stepped region 54 extends generally orthogonally to the resilient leg 51 and includes an extended region 56 that extends from the leading end of the stepped region 54 generally in parallel to the direction of insertion of the mounting clip 5, i.e. to the resilient leg 51, which extended region 56 defines the leading end of the mounting clip 5. Each of the extended regions 56 includes at the center a retaining pawl 55 that is formed by cutting and raising part of the central region of the extended region 56 outwardly. As shown in FIG. 13, when assembling the mounting clip 5 with the hinge body 31, the mounting clip 5 is inserted, from the head, into the front side of the rectangular opening 37 of the hinge body 31, and then pushed up to the insertion end. At this time, the stepped regions 54 of the clip 5 are retained by the inner peripheral regions 35 located on opposite sides of the rectangular opening 37 whereas the retaining pawls 55 enter into the holes 34 of the rectangular opening 37 and seat on the holding regions 36 located in front of the holes 34.

FIG. 13 illustrates the manner the mounting clip 5 is assembled with the hinge body 31 of the left hinge assembly 3 and such a drawing is omitted as to the hinge body 21 of the right hinge assembly 2. However, as shown in FIG. 11(a), the hinge body 21 of the right hinge assembly 2 also includes in the rectangular opening 27 a pair of the holes 24 and is configured to receive the stepped regions 54 of the mounting clip 5 by the inner peripheral regions 25. The hinge body 21 also includes in front of the holes 24 a pair of the holding portions 26 for engagement with the retaining pawls 55 of the mounting clip 5 when the mounting clip 5 is inserted into the rectangular opening 27 of the hinge body 21 from the front side.

As shown in FIGS. 5 and 6, each of the covers 4 that cover the front side of the hinge bodies 21 and 31 includes a main body 41 that covers the front side of the hinge body 21 or 31 and a clip support portion 42 projecting from the back side of the main body 41. The clip support portion 42 includes two pairs of steeple heads for fitting into an interior of the mounting clip 5. The main body 41 is provided on both inner sides with engaging pawls 43 to be retained by the cover engaging portions 29/39 formed on both sides of the hinge body 21/31.

As described above, a torsion coil spring 6 is set between the inner support 22 and outer support 23 of the hinge body 21 placed in the right cavity 11 of the grip body 1 to bias the grip body 1 toward the non-use position (i.e. the position indicated by solid lines in FIG. 3) relative to the hinge assemblies 2 and 3. As shown in FIG. 5, the torsion coil spring 6 is contained between the inner support 22 and outer support 23 in the cavity 11 of the grip body 1 with a first end segment 61 retained by the vicinity of the inner side of the inner support 22 of the hinge body 21 and a second end segment 62 held in a recess 11a (FIG. 4) formed on the cavity 11. Thus the torsion coil spring 6 biases the grip body 1 toward the non-use position relative to the hinge body 21.

Likewise, an oil damper 8 is set between the inner support 32 and outer support 33 of the hinge body 31 placed in the left cavity 12 of the grip body 1, as shown in FIGS. 4 and 6. The oil damper 8 includes a cylindrical inner tube 82 and an outer tube 81 mounted around the inner tube 82 in a rotatable manner. A void space is provided between the inner tube 82 and outer tube 81 and filled with oil, thus the damper 8 exhibits braking force due to viscosity resistance of oil when the inner tube 82 and outer tube 82 rotate relative to each other.

The oil damper 8 further includes a shaft hole 83, at the axial center of the inner tube 82, for receiving the pivot shaft 16 as shown in FIG. 4, and an oblong boss 84. The oblong boss 84 is formed in such a manner as to project from the leading end of and the pivoting position of the inner tube 82 to fit in an oblong recessed region 32b formed on the inner side of the inner support 32 as the oil damper 8 is set in between the inner support 32 and outer support 33 of the hinge body 31.

In addition, the oil damper 8 is provided on the outer circumference of the outer tube 81a linear protrusion 85 for engagement with an engaging portion 12a (FIG. 4) formed inside the cavity 12 as the oil damper 8 is set in between the inner support 32 and outer support 33 of the hinge body 31. As being such, when the grip body 1 is pulled to rotate, the outer tube 81 of the oil damper 8 rotates together with the grip body 1. Since the hinge assembly 3 is secured to the body panel of the vehicle body and the inner tube 82 of the oil damper 8 is held by the inner support 32 by the oblong boss 84, the inner tube 82 rotates relative to the outer tube 81 when the grip body 1 rotates about the hinge assembly 3, while an adequate resistance to rotation is exerted.

Assembling of the assist grip begins with assembling of the mounting clips 5 with the hinge bodies 21 and 31, which is easily done by inserting the mounting clips 5, from the head, into the rectangular openings 27 and 37, respectively, from the front side and pushing them in toward the back side, as shown in FIG. 13. At this time, the mounting clips 5 easily enter into the rectangular openings 27 and 37 while flexing the resilient legs 51 inwardly till the ingress end where the stepped regions 54 abut against the inner peripheral regions 25 and 35 of the hinge bodies 21 and 31 whereas the retaining pawls 55 are retained by the holding regions 26 and 36 of the hinge bodies 21 and 31. Thus the mounting clips 5 are securely positioned at predetermined positions of the hinge bodies 21 and 31, which prevents the clips 5 from slipping toward the front side when inserting the clips 5 into rectangular holes of the body panel of a vehicle, and facilitates the mounting work.

Subsequently, the right hinge body 21 having the torsion coil spring 6 placed between the inner support 22 and outer support 23 is located on a predetermined position in the cavity 11. Then the pivot shaft 15 is inserted into the shaft hole 13 from the outside of the cavity 11, and put into the shaft hole 23a of the outer support 23 and out of the shaft hole 22a of the inner support 22 so the pivot shaft 15 penetrates the torsion coil spring 6, and then the leading end of the pivot shaft 15 is inserted into the other shaft hole 13, such that the hinge body 21 is rotatably supported by the grip body 1. Since the first end segment 61 of the torsion coil spring 6 is retained by part of the hinge body 21 and the second end segment 62 is held in the periphery of the cavity 11 of the grip body 1, the hinge body 21 is biased toward the cavity 11 due to spring force of the coil spring 6 in the cavity 11.

In a similar manner, the left hinge body 31 having the oil damper 8 placed between the inner support 32 and outer support 33 is located on a predetermined position in the cavity 12. Then the pivot shaft 16 is inserted into the shaft hole 14 from the outside of the cavity 12, and put into the shaft hole 33a of the outer support 33 and out of the shaft hole 32a of the inner support 32 so the pivot shaft 16 penetrates the oil damper 8, and then the leading end of the pivot shaft 16 is inserted into the other shaft hole 14, such that the hinge body 31 is rotatably supported by the grip body 1. Since the oblong boss 84 of the oil damper 8 fits in the oblong recessed region 32b formed on the inner side of the inner support 32 and the linear protrusion 85 formed on the outer tube of the oil damper 8 is held on by the engaging portion 12a of the cavity 12 of the hinge body 1, the oil damper 8 assigns resistance to rotation to the hinge body 31 due to viscosity resistance of its oil.

Thereafter, the covers 4 are provisionally mounted to the front side of the hinge bodies 21 and 31. This is done by inserting the clip support portion 42 formed on the back side of each of the covers 4 up to an intermediate position in the rectangular opening 27/37 of the hinge body 21/31. When the mounting clips 5 are fastened into rectangular holes of the body panel of a vehicle, the covers 4 are in this provisionally mounted state relative to the hinge bodies 21 and 31, in which state the bulging portions 52 of the mounting clips 5 are movable.

Figure 14:
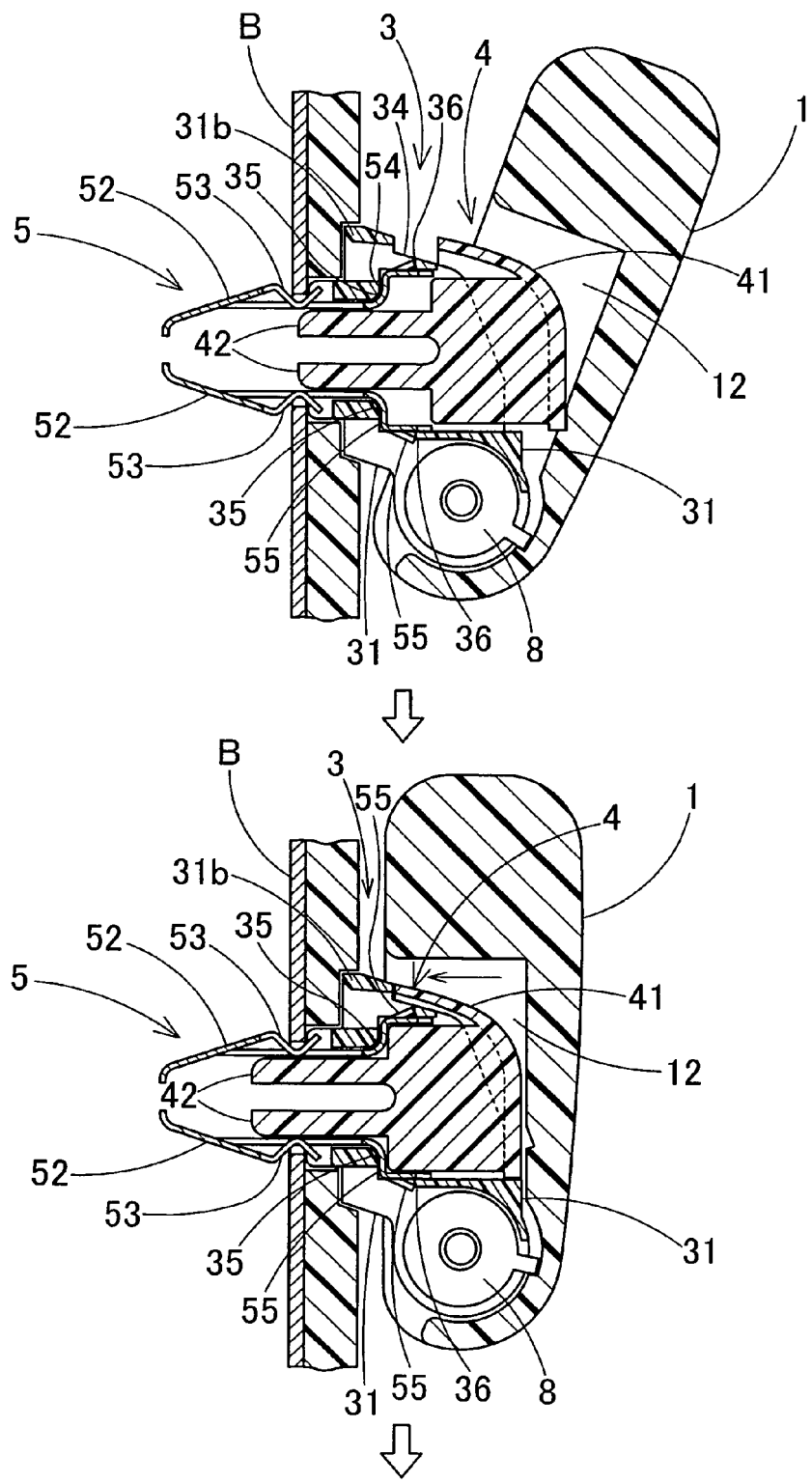
FIG. 14 is a diagram illustrating the mounting of the assist grip on a body panel of a vehicle by sectional views.
Figure 15:
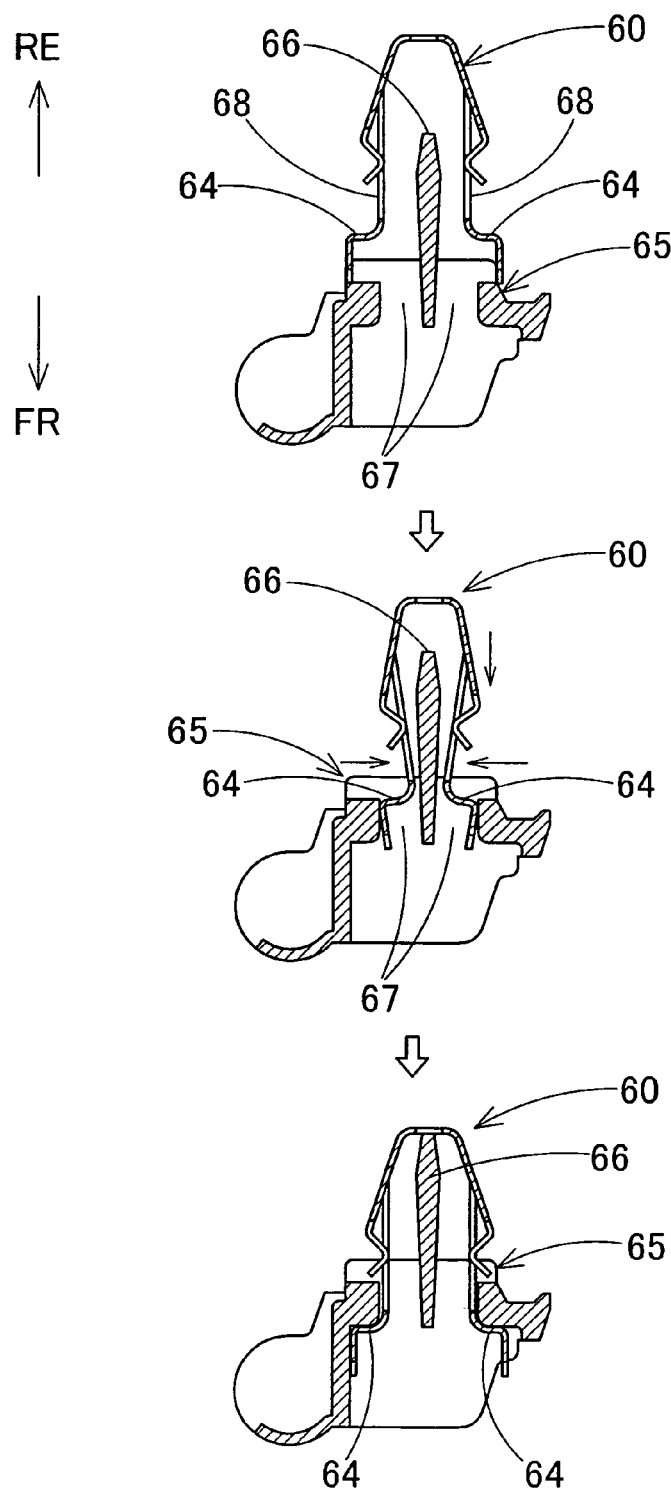
FIG. 15 is a diagram illustrating the insertion of a conventional mounting clip into a hinge body by sectional views.

When the assist grip is mounted on a predetermined location in a vehicle compartment, the hinge assemblies 2 and 3 located at opposite ends of the assist grip are pushed into rectangular holes formed on the body panel B and a molded ceiling covering as shown in FIG. 14. At this time, the bulging portions 52 of the mounting clips 5 on both of the hinge bodies 21 and 31 go into the rectangular holes while abutting against peripheries of the rectangular holes and deforming elastically, and when the bulging portions 52 completely enter into the rectangular holes, the peripheries of the rectangular holes of the body panel B are clamped between the retention portions 53 of the bulging portions 52 and seat portions 21b and 31b formed on the leading ends of the hinge bodies 21 and 31.

When the mounting clips 5 are fastened into the rectangular holes of the body panel B, the mounting clips 5 are subjected to a load acting to remove the clips due to reaction force from the body panel B on the front side of the hinge assemblies 2 and 3 (on the lower side in FIG. 13), but the load is supported by the retaining pawls 55 formed on the leading ends of the resilient legs 51 of the mounting clips 5 and retained by the holding regions 26 and 36 of the hinge bodies 21 and 31 as shown in FIG. 13. Accordingly, when fastening the mounting clips 5 into rectangular holes of a body panel of a vehicle, the mounting clips 5 are securely fastened on the peripheries of the rectangular holes without slippage and thus the hinge assemblies 2 and 3 are easily and tightly secured to the body panel.

Thereafter, the covers 4 assembled provisionally are pushed into interiors of the hinge bodies 21 and 31 such that the engaging pawls 43 formed at the inner side thereof engage with the cover engaging portions 29 and 39 located on both sides of the hinge bodies 21 and 31. In this state, as shown in FIG. 14, the clip support portions 42 of the covers 4 completely fit in the interiors of the mounting clips 5, which makes the mounting clips 5 tightly secured to mounting locations of the vehicle body structure and completes the mounting of the assist grip.

As has been described, when assembling the mounting clips 5 with the hinge bodies 21 and 31, the mounting clips 5 are easily assembled therewith by being inserted into the rectangular openings 27 and 37 from the front side of the hinge bodies 21 and 31. In the assembled state, moreover, the retention of the retaining pawls 55 of the mounting clips 5 by the holding portions 26 and 36 of the hinge bodies 21 and 31 as well as the retention of the stepped regions 54 of the resilient legs 51 by the inner peripheral regions 25 and 35 of the rectangular openings 27 and 37 fasten the mounting clips 5 to the hinge bodies 21 and 31 in a stable manner, even without a center support plate provided in the rectangular opening in prior designs of the hinge assembly.

According to the configuration of the foregoing embodiment, an assembly worker no longer has to press resilient legs 51 forcefully against spring resiliency to assemble the mounting clips 5 with the hinge bodies 21 and 31, but can easily assemble the mounting clips 5 with the hinge bodies 21 and 31 from the front side of the hinge assemblies 2 and 3. Not having to press the resilient legs 51 forcefully against spring resiliency also gets rid of a fear of deterioration of resiliency of the resilient legs 51 and breakage of the resilient legs 51. Moreover, since the rectangular opening of the hinge body is wholly open without a center support plate which was required in the prior designs, the structures of the molds for the hinge bodies 21 and 31 will be simplified and thus reducing the cost for manufacturing an assist grip.

Furthermore, when attaching the mounting clips 5 to the hinge bodies 21 and 31, the mounting clips 5 easily enter into the rectangular openings 27 and 37 of the hinge bodies 21 and 31 merely by flexing the resilient legs 51 slightly inward and, at the ingress end, the stepped regions 54 abut against the inner peripheral regions 25 and 35 of the hinge bodies 21 and 31 whereas the retaining pawls 55 are retained by the holding regions 26 and 36 of the hinge bodies 21 and 31. Thus the mounting clips 5 are securely positioned at predetermined positions of the hinge bodies 21 and 31, which prevents the clips 5 from slipping toward the front side when inserting the clips 5 into rectangular holes of the body panel B. This facilitates the mounting work and resolves assembly failures.

When using the assist grip, a user will rotate the grip body 1 downward about the hinge assemblies 2 and 3 as shown in FIG. 3. The grip body 1 is pulled downward by the central region, and at this time the rotation of the recess 11a of the cavity 11 in the grip body 1 twists the second end segment 62 of the torsion coil spring 6 against torsion spring force of the spring 6. Thus the grip body 1 rotates downward against the torsion spring force and kept in in-use condition while the user holds the grip body 1.

When the user stops holding the grip body 1, the grip body 1 rotates upward due to an upward (clockwise, in FIG. 3) biasing force exerted by the second end segment 62 of the torsion coil spring 6 and returns to the non-use condition (to the position indicated by solid lines in FIG. 3). At this time, the oil damper 8 brakes the rotation of the grip body 1 such that the grip body 1 returns to the non-use position at low speed.

The invention claimed is:

1. An assist grip comprising:
    a grip body for hand-holding, the grip body including first and second bases at opposite ends thereof and first and second cavities respectively formed on the back of the bases;
    first and second hinge assemblies pivotally connected to the cavities via pivot shafts and respectively including first and second hinge bodies, each of the hinge bodies including a rectangular opening generally at the center; and
    first and second mounting clips formed of metal having spring resiliency and bent into a generally U shape and respectively inserted into the rectangular openings;
    each of the mounting clips including a pair of resilient legs, each of the resilient legs including a bulging portion that bulges outwardly and is provided with a retention portion to be retained by a mounting location of a vehicle body structure, and each of the resilient legs further including at a leading end a stepped region engaged against an inner peripheral region of the rectangular opening of one of the hinge bodies, characterized in that:
    each of the stepped regions of each of the mounting clips includes an extended region that extends in parallel to a direction of insertion of the mounting clip into the rectangular opening and a retaining pawl that extends outwardly relative to the extended region; and
    each of the hinge bodies includes a pair of holding portions that hold the retaining pawls of the mounting clip when the mounting clips are inserted into the rectangular openings of the hinge bodies from the front side of the hinge bodies.

2. The assist grip as set forth in claim 1, wherein each of the retaining pawls is comprised of a central part of the extended region so parted from remainder of the extended region as to project obliquely forward and outwardly relative to the extended region.

3. The assist grip as set forth in claim 1, wherein the holding portions are comprised of peripheries of a pair of holes provided on opposite side walls of the rectangular opening of the hinge body.

\* \* \* \* \*